US009844263B2

(12) United States Patent
Monteiro (10) Patent No.: US 9,844,263 B2
(45) Date of Patent: Dec. 19, 2017

(54) OFFICE CHEST OF DRAWERS WITH AREA FOR KEEPING OBJECTS

(71) Applicant: Luciano Trindade de Sousa Monteiro, Sao Paulo (BR)

(72) Inventor: Luciano Trindade de Sousa Monteiro, Sao Paulo (BR)

( * ) Notice: Subject to any disclaimer, the term of this patent is extended or adjusted under 35 U.S.C. 154(b) by 0 days.

(21) Appl. No.: 15/357,173

(22) Filed: Nov. 21, 2016

(65) Prior Publication Data

US 2017/0172296 A1    Jun. 22, 2017

(30) Foreign Application Priority Data

Dec. 17, 2015  (BR) .............................. 102015031758
Jun. 24, 2016  (BR) .............................. 102016015017

(51) Int. Cl.
| | |
|---|---|
| *A47B 67/00* | (2006.01) |
| *A47B 67/04* | (2006.01) |
| *A47B 81/00* | (2006.01) |
| *A47B 88/04* | (2006.01) |
| *A47B 96/06* | (2006.01) |
| *A47B 31/00* | (2006.01) |
| *A47B 91/00* | (2006.01) |
| *A47B 97/00* | (2006.01) |

(52) U.S. Cl.
CPC .............. *A47B 67/04* (2013.01); *A47B 31/00* (2013.01); *A47B 81/00* (2013.01); *A47B 88/04* (2013.01); *A47B 96/068* (2013.01); *A47B 91/00* (2013.01); *A47B 97/00* (2013.01); *A47B 2031/003* (2013.01)

(58) Field of Classification Search
CPC ... A47B 67/00; A47B 67/04; A47B 2031/003; A47B 81/00; A47B 81/002; A47B 88/403
See application file for complete search history.

(56) References Cited

U.S. PATENT DOCUMENTS

| | | | | |
|---|---|---|---|---|
| 2,615,776 | A * | 10/1952 | Lorentzen | A47B 67/00 |
| | | | | 312/289 |
| 2,941,659 | A * | 6/1960 | Thrower | A47B 61/04 |
| | | | | 12/53.7 |
| 2007/0103039 | A1 * | 5/2007 | Holcomb | A47B 47/0075 |
| | | | | 312/107 |
| 2008/0164724 | A1 * | 7/2008 | Burnett | A47B 67/04 |
| | | | | 296/190.02 |
| 2009/0230828 | A1 * | 9/2009 | Thomasson, II | A47B 67/04 |
| | | | | 312/237 |

(Continued)

*Primary Examiner* — Daniel J Rohrhoff
(74) *Attorney, Agent, or Firm* — Alston & Bird LLP (57) ABSTRACT

Provided is an office chest of drawers (10) for putting objects, comprising a lateral base section (20) associated to a top side section (30), the lateral base section (20) and the top side section (30) configure at least one back area (21) for putting objects and at least one top area (31) for putting objects, the office chest of drawers (10) comprising at least one drawer (50) in a front region (11) and at least one trunk (110) in the back region (12), said at least one drawer (50) in the front region (11) having length and depth dimensions cooperating with the dimensions of the top side section (30), said at least one trunk (110) in the back region (12) exhibiting length, depth and height dimensions cooperating with the dimensions of the additional area below the back area (21) for putting objects and occupied by the lateral base section (20) of longer length than the top side section (30).

22 Claims, 6 Drawing Sheets

(56) References Cited

U.S. PATENT DOCUMENTS

| | | | |
|---|---|---|---|
| 2011/0025181 A1* | 2/2011 | Vinke | A47B 57/20 312/257.1 |
| 2014/0217861 A1* | 8/2014 | Cole | A47B 45/00 312/205 |
| 2016/0037918 A1* | 2/2016 | Greer | A47B 31/00 312/283 |

* cited by examiner

OFFICE CHEST OF DRAWERS WITH AREA FOR KEEPING OBJECTS

CROSS-REFERENCE TO RELATED APPLICATION

This application claims priority to and full benefit of Brazilian Patent Application No. BR102016015017-5, filed on Jun. 24, 2016, and Brazilian Application No. BR102015031758-1, filed Dec. 17, 2015, the entire disclosure of both of which as are hereby incorporated by reference herein in their entireties.

BACKGROUND

Related Field

The present invention relates to a movable office chest of drawers for use in office-like environments, provided with a configuration that enables better utilization of its area for keeping objects, wherein the arrangement of the drawers in both front and back regions, or alternatively the arrangement of the drawers in at least one of the front region, and in at least trunk in the back region.

Description of Related Art

The use of office chests of drawers, also known as under desk file cabinet, for keeping objects and documents at offices and other similar environments is relatively common. In general, office chests of drawers manufactured and sold at present exhibit a parallelepiped-type or trapezium-type one-piece volume, occupied by drawers that may vary in size. The drawers usually face a single side of the office chest of drawers (front), so as to facilitate access to all of them.

In short, the office chests of drawers known so far are limited to the single function of providing a frame and access for supporting a plurality of drawers. Although a chest of drawers is effective in this objective, it exhibits usefulness only on one of its sides, which is the one chosen for access to the drawers. Usually, considering the front to be the drawer area, the sides, the top and the back then configure areas without any usefulness, since they do not nave configuration adapted for any function other than the drawer support itself. Moreover, one observes that the drawers are arranged only at the front side, without arrangement of drawers at the sides or in the back region.

Moreover, the usefulness of the drawers is also relative, since the back portion of the drawers does not have a good area for use, chiefly for small objects. Hence the expression: "lost in the bottom of the drawer". One can then understand that the presently known office chests of drawers offer relatively inefficient use of space in this regard.

One observes that in modern offices a quite present concept is that of community layout, that is, the one in which nobody has a desk or a predetermined work place, so that people can remain where they deem better to develop their work. In this concept, employees usually put their rucksacks and bags on desks, chairs, or on the floor, increasing more and more the number of these belongings on the pieces of furniture. One can note that people do not have near and adequate place to put this type of personal belongings, as well as to put printers and/or other apparatus that are usually put on desks that might be near, but out of the work area.

In this environment, it is extremely important to make use of the whole available space and areas in the best way possible, in order to keep objects, including personal ones. As already clarified, existing chests of drawers used in such environments, although occupying a good area beneath the work desk, do not enable good use of this space, which would be better shared between work folders and area for personal belonging such as bags and rucksacks, and possibly printers and other apparatuses of similar volume.

Thus, one cannot observe in the prior art a piece of furniture such as an office chest of drawers on castors that enables good use of all the potentially useful areas of its configuration for keeping objects and that exhibits good usefulness for the area known as bottom of the drawer and that, in the front part of easier access, good utilization for work objects and also for work folders, wherein suspended folders are the most employed ones.

Moreover, one cannot observe in the prior art an office chest of drawers on castors that enables arrangement of drawers not only in the front region, but also in one of the side regions or in the back region, such configuration enabling total utilization of the total volume of the office chest of drawers.

BRIEF SUMMARY

A first objective of the present invention is to provide an office chest of drawers on castors, provided with a configuration that enables better utilization of useful area, particularly the area known as "bottom of the drawer", and also with access from the sides and from the top, and providing space for housing personal belongings, or even office apparatuses of personal use, often on the desk, such as printers, etc.

A second objective of the present invention is to provide an office chest of drawers on castors, provided with a trunk space, the trunk having in a first configuration being arranged in the back region, and in a second configuration arranged this back area to be an open area.

The objectives of the present invention are achieved by means office chest of drawers with area for keeping objects, comprising a lateral base portion associated top side section, the lateral base section and the top side section configuring at least one back area for keeping objects and at least one top area for keeping objects, the chest of drawers comprising at least one drawer ion a front region and at least one drawer in one of the back and side regions, and at least one drawer in the front region having length and depth dimensions cooperating with the dimensions of the top side section, and at least one drawer in one of the back and side regions having length, depth and height dimensions cooperating with the dimensions of the additional area below the back area for keeping objects and occupied by the lateral base section of longer length than the top side section.

BRIEF DESCRIPTION OF THE FIGURES

The present invention will now be described in details with reference to an embodiment represented in the drawings. The figures show.

DETAILED DESCRIPTION OF VARIOUS EMBODIMENTS

The office chest of drawers 10 of the present invention is configured to enable better utilization of useful areas, particularly of the area known as "bottom of the drawer" and also with access from the sides and from the top. Besides, the office chest of drawers 10 is provided with space for keeping various personal belongings, or even office apparatus of person al use, often on desks, like printers, etc.

The employ of the present invention enables utilization of a poorly used area of present-day chests of drawers for housing personal objects such as purses, brief cases and rucksacks, in an organized way and without being detrimental to the decoration of the office environments. These objects, which presently have an appropriate and organized place to be kept, often remain on chairs, desks or on the floor under desks, etc.

The present invention also enables better use of existing and common office chest of drawers, preventing waste of space in the environments. The present invention achieves its objectives by arranging sections 20, 30 that compose it so as to form at least one area for keeping objects 21, 31, as will be seen hereinafter.

In one exemplary and non-limiting embodiment, the office chest of drawers 10 is provided with rotary castors 91. However, it should be noted that this is only one exemplary and non-limiting embodiment, so that the office chest of drawers 10 may be a table, bookstand, desk, or any other similar piece of furniture.

Figure 1:
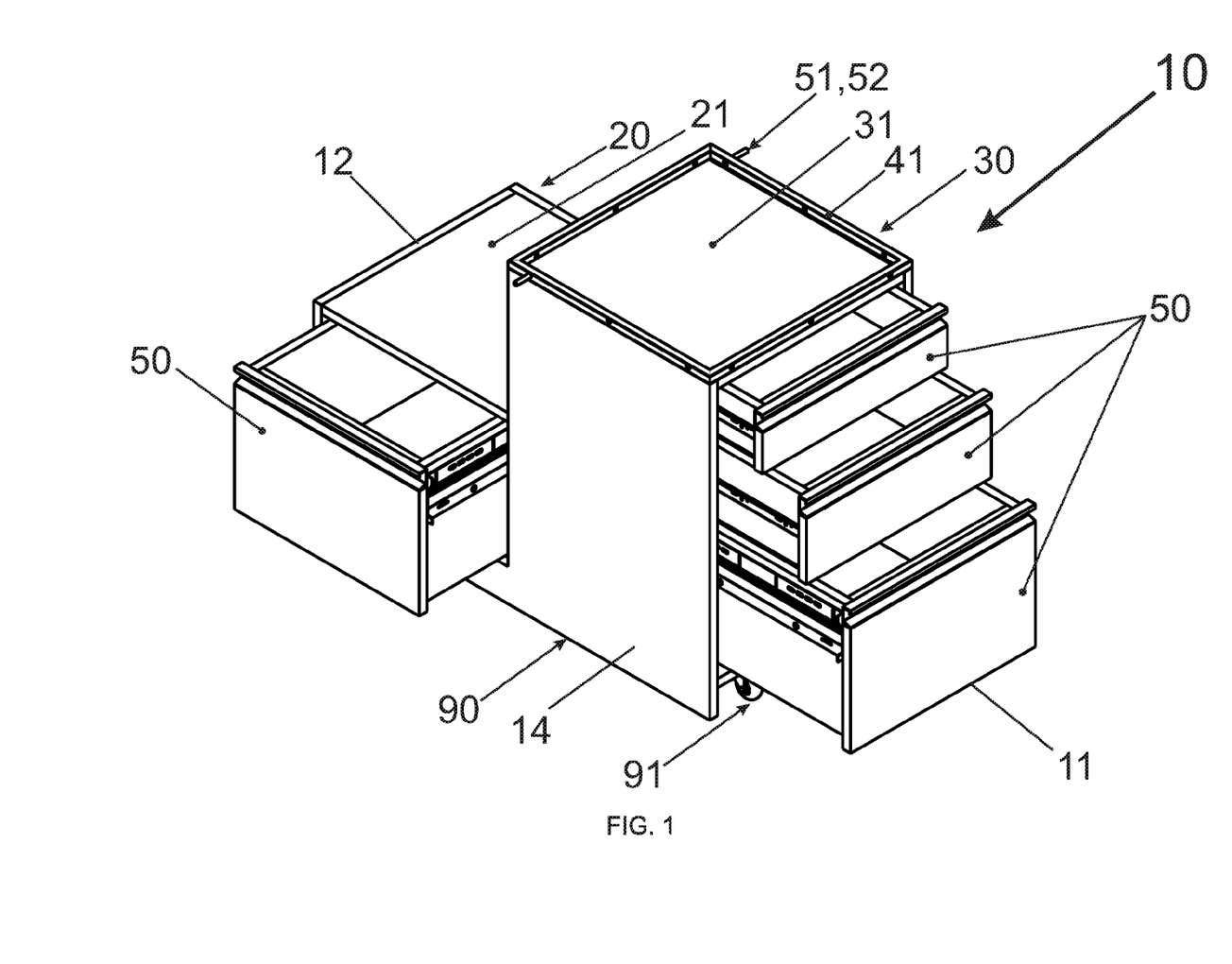
FIG. 1 is a perspective front view of an office chest of drawers having back and front areas for keeping objects, the chest of drawers having L-shaped geometry and drawers arranged in the front region and in one of the side regions, as taught in the present invention.

FIG. 1 shows a perspective front view of the office chest of drawers of the present invention. The office chest of drawers 10 in its entirety may be composed by a great diversity of materials, as for example, wood, polymers, metal, or any other material that is usually employed in making chests of drawers according to the technical practice.

The office chest of drawers 10 comprises a first lateral base section 20 and a top side section 30, arranged adjacent to each other and both having substantially parallelepiped-like or trapezium-like geometry. The office chest of drawers 10 further comprises a conventional chest side in which a cut is made throughout the lateral base section 20, which results in the L-shaped or inversed-L-shaped side when seen from the opposite side.

The office chest of drawers 10 has the region corresponding to the top side section 30, where drawers with smaller depth are inserted, being more suitable chiefly for keeping small personal objects. Moreover, one observes that the region corresponding to the lateral base section 20, which is suitable for housing a large drawer for keeping suspended folders in its whole depth.

For a better understanding of the invention, one defines that the office chest of drawers 10 has a front region 11, a back region 12 opposite the front region 11, a top region 13, two side regions 14 opposite each other and a bottom region 15 below and opposite the top region 13. The regions as defined herein are not imperative to achieve the present invention, and should be regarded only as illustrative references for clarifying the characteristics to be clarified.

Further with reference to FIG. 1, one can observe that the surface of the lateral base section 20 has dimensions larger than the surface of the top side section 30, specifically its depth. Thus, a substantially L-shaped geometry is configured between the lateral side section 20 and the top side section 30. The L-shaped geometry configured by the sections 20, 30 is provided with at least one back area for keeping objects 21 and one top area for putting objects 31. Said areas 21, 31 are formed specifically by the plane surfaces configured by the L-shaped geometry and may be as many as the geometry allows and as many as one wishes to obtain.

From the definition of the areas 21, 32, the present invention provides the availability of additional useful areas, that it, the top area 31 for putting small work objects like pens, pencils, etc. and the back area 21 for putting objects like purses, briefcases and rucksacks and, as a result, utilization of the back region, which were poorly used in the case of office chests of drawers known from the prior art. Additionally, the area 21 may be located in any one of the four faces of the office chest of drawers 10 and represent a front or side work area, or still an intermediate area between the opposite faces.

Further with reference to FIG. 1, one observes that the lateral base section 20 and top section 30 are associated to at least one open area 21 or trunk 110 in the back region. The office chest of drawers 10 comprises at least one drawer 50.

In the configuration illustrated in FIG. 1, the office chest of drawers 10 comprises three drawers 50 in its front region 11 of different heights and with equal length and depth.

It should be pointed out that the drawers 50 of the front region 11 exhibit length and depth dimensions cooperating with the dimensions of the top side section 30. Thus, one observes that the drawers 50 of the front region 11 have a movement limit defined by the dimensions of the top side section 30. Such a configuration enables the last drawer 50 of the front region 11 not to occupy the additional area below the back area 21 for putting objects, which is occupied by the lateral base section 20 of greater length than the top side section 30.

Thus, one of the side regions 14 can receive a drawer 50 with length, depth and height dimensions cooperating with the dimensions of the additional area, below the back area 21 for putting objects, occupied by the lateral base section 20 of longer length than the top side section 30.

Thus, one observes that, with arrangement of the drawers 50 in the front region 11 and in one of the side regions 14, the spaces occupied by them do not exceed the internal volume determined by the office chest of drawers 10. In the embodiment of FIG. 1, three of the drawers 50 are opened from the front region 11 and one drawer 50 is opened from the side region 14.

The last drawer 50 of the front region and the drawer 50 of the side region 14 are more suitable for keeping suspended folders. The other drawers 50 of the front region 11 are more suitable for objects of smaller volumes.

Figure 2:
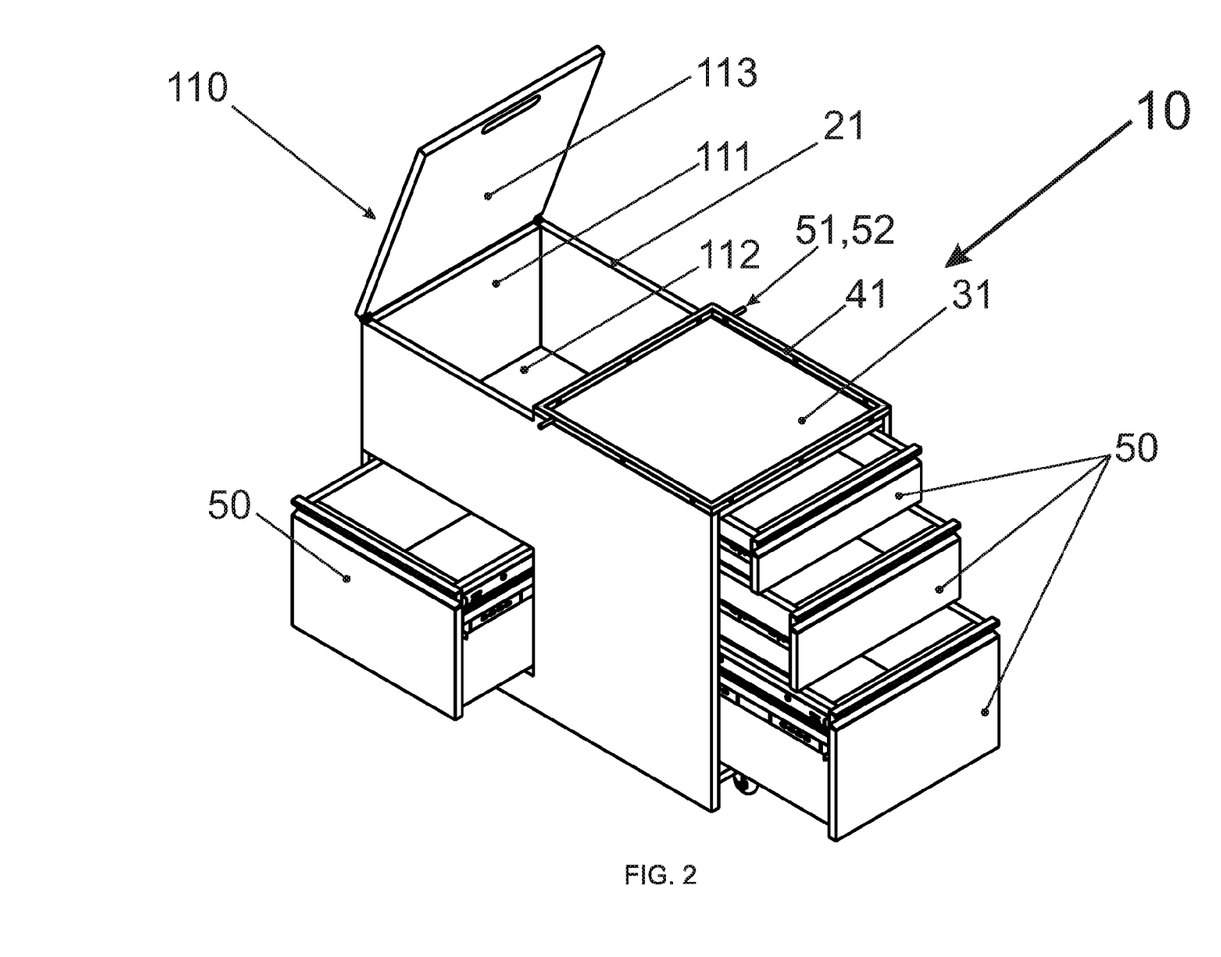
FIG. 2 is a perspective front view of an office chest of drawers having back and top areas for keeping objects, the back area for keeping objects comprising a trunk with a cover, the chest of drawers exhibiting parallelepiped-shaped geometry and drawers arranged in the front region and in one of the side regions, according to teachings of the present invention.

In the embodiment of FIG. 2, one illustrates an office chest of drawers 10 provided with back and top areas 21, 31 for putting objects, the back area 21 comprising a trunk 110 with cover 113, the office chest of drawers 10 having parallelepiped-like geometry and drawers 50 arranged in the front region 11 and in one of the side regions 14. It should be pointed out that the drawer 50 might be alternatively arranged in the back region 12, instead of being arranged in one of the side regions 14.

One observes that such an embodiment illustrates an office chest of drawers 10 comprising three drawers 50 in its front region 11 of different heights and with equal length and depth.

It should be pointed out that the drawers 50 of the front region 11 exhibit length and depth dimensions cooperating with the dimensions of the top side section 30. Thus, one observes that the drawers 50 of the front region 11 have a movement limit defined by the dimensions of the top side section 30. Such a configuration enables the last drawer 50 of the front region 11 not to occupy the additional area, below the back area 21 for putting objects, occupied by the lateral base section 20 of longer length than the tope side section 30.

Thus, the side region 14 or the back region 12 can receive a drawer 50 with length, depth and height dimensions cooperating with the dimensions of the additional area, below the back area 21 for putting objects, occupied by the lateral base section 20 of longer length than the top side section 30.

Thus, one observes that, with arrangement of the drawers 50 in the front region 11 and in the back region 12 or in the side region 14, the spaces occupied by the drawers do not exceed the internal volume determined by the office chest of drawers 10. In the embodiment of FIG. 2, three of the drawers 50 are opened from the front region 11 and one drawer 50 is opened from the back region 12 and from the side region 14.

The last drawer 50 of the front region 11 and the drawer 50 of the back region 12 or of the side region 14 are more suitable for keeping suspended folders. The other drawers 50 of the front region 11 are more suitable for objects of smaller volumes.

With reference to the trunk 110, one observes that it is formed by side plates 111 and a bottom 112. Alternatively, the trunk 110 may not comprise a bottom 112, may not comprise the bottom 112 and the side plates 111, may not comprise the side plates 111 and may comprise only the cover 113 and the bottom 112.

Figure 3:
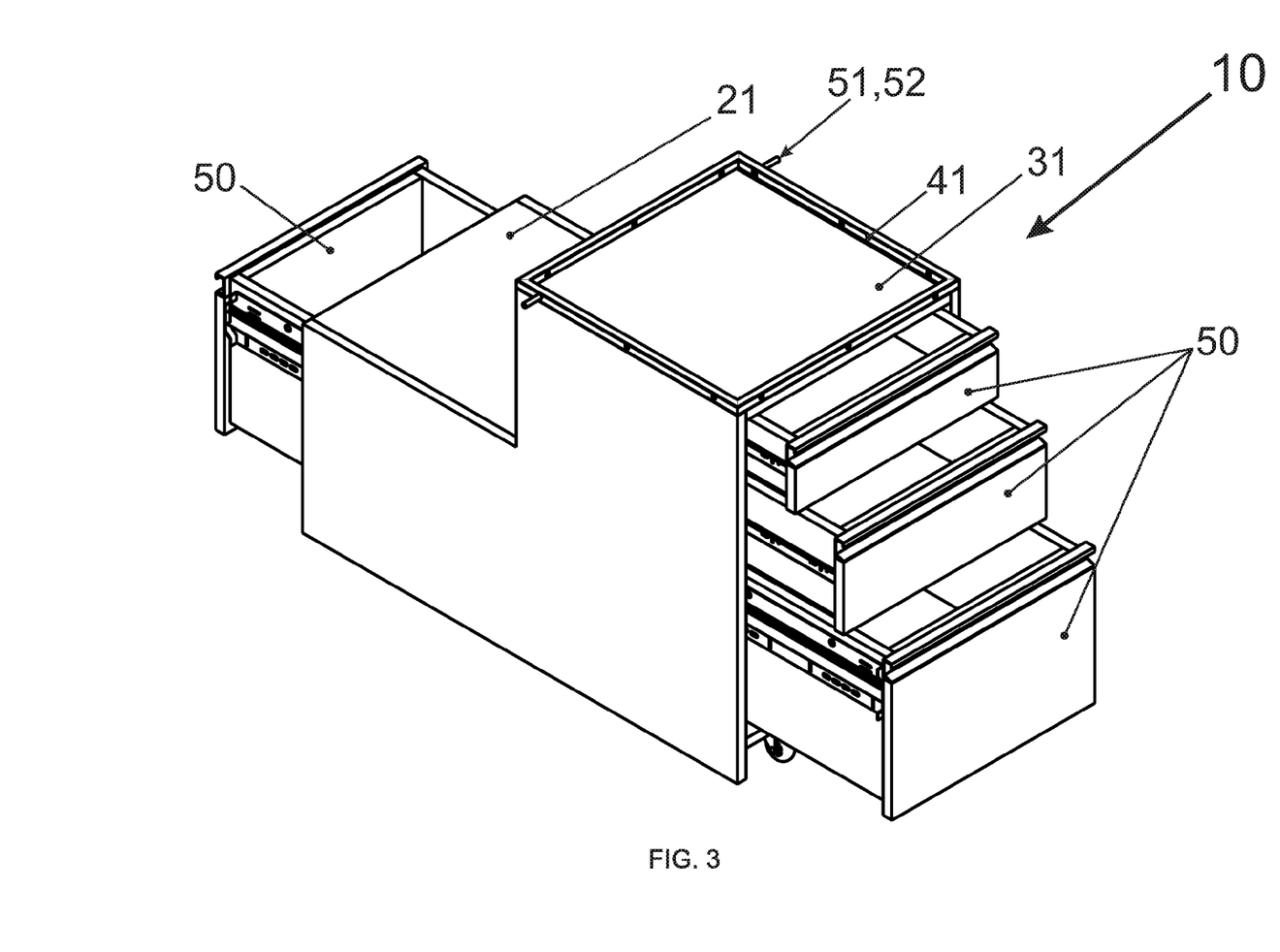
FIG. 3 is a perspective front view of the office chest of drawers provided with back and top areas for keeping objects, the chest exhibiting L-shaped geometry and drawers arranged in the front region and in the back region, according to teachings of the present invention.

In the embodiment illustrated in FIG. 3, one illustrates a perspective front view of an office chest of drawers 10 provided with back and top areas 21, 31 for putting objects, the office chest of drawers 10 having L-shaped geometry and drawers 50 arranged in the front region 11 and in the back region 12.

One observes that such embodiment illustrates an office chest of drawers 10 comprising three drawers 50 in its front region 11 of different heights and with equal length and depth.

It should be pointed out that the drawers 50 of the front region 11 exhibit length and depth dimensions cooperating with the dimensions of the top side section 30. Thus one observes that the drawers 50 of the front region 11 have a movement limit defined by the dimensions of the top side section 30. Such an embodiment enables the last drawer 50 of the front region 11 not to occupy the additional area, below the back area 21 for putting objects, occupied by the lateral base section 20 of longer length than the top side section 30.

Thus, the back region 12 can receive a drawer 50 with length, depth and height dimensions cooperating with the dimensions of the additional area, below the back area 21 for putting objects, occupied by the lateral side section 20 of longer length than the top side section 30.

Thus, one observes that, with arrangement of the drawers 50 in the front region 11 and in the back region 12, the spaces occupied by the drawers do not exceed the internal volume determined by the office chest of drawers 10. In the embodiment of FIG. 3, three of the drawers 50 are opened from the front region 11 and one drawer 50 is opened from the back region 12.

Figure 4:
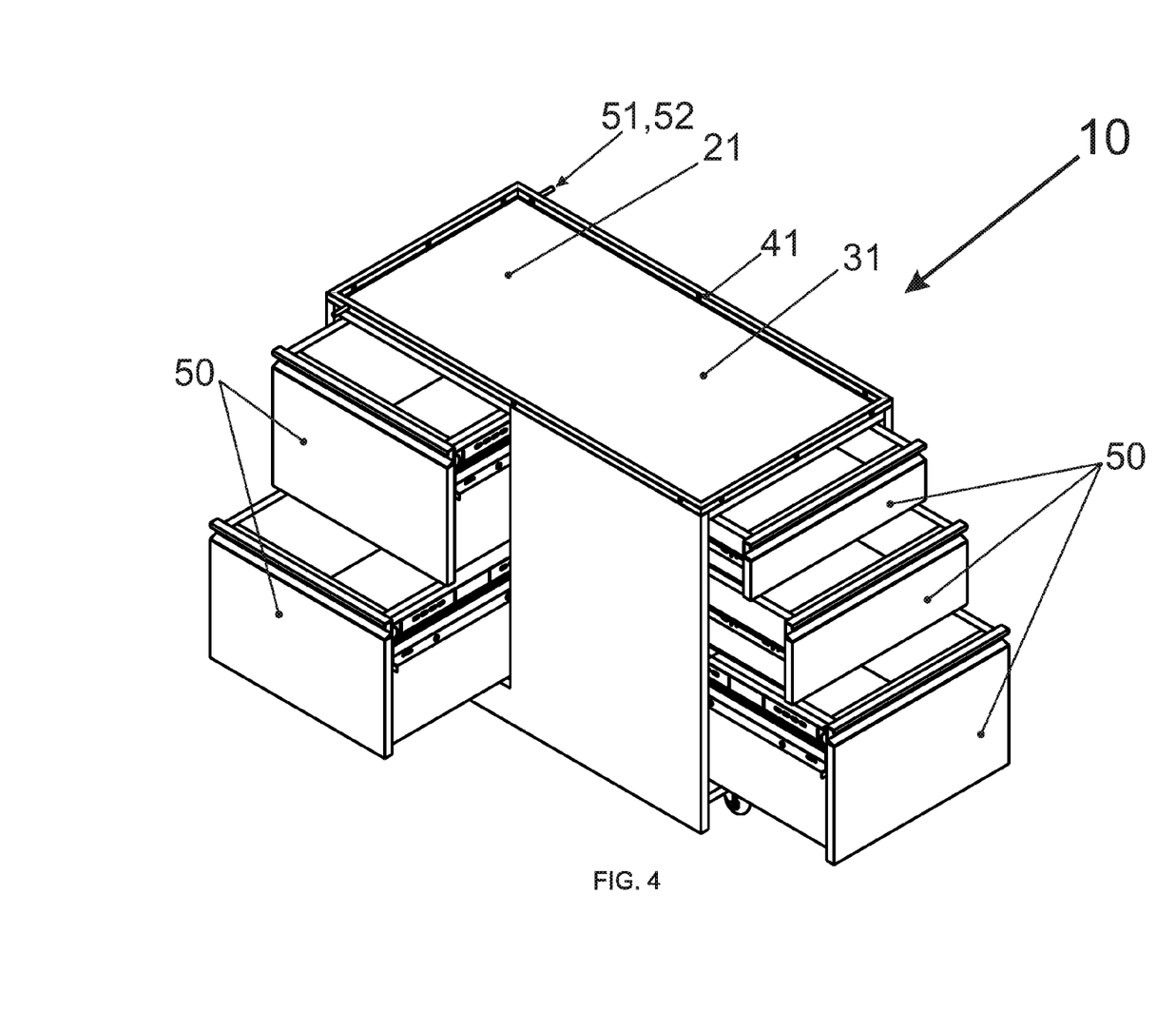
FIG. 4 is a perspective front view of an office chest of drawers provided with back and top areas for keeping objects, forming a single integral area, the chest exhibiting parallelepiped-shaped geometry and drawers arranged in the front region and in one of the side regions, according to teachings of the present invention.

In the embodiment of FIG. 4, one illustrates a perspective front view of an office chest of drawers 10 provided with back and top areas 21, 31 for putting objects, forming integrally a single area, the office chest of drawers 10 exhibits parallelepiped-like geometry and drawers 50 arranged in the front region 11 and in one of the side regions 14. It should be pointed out that the drawers 50 might be alternatively arranged in the back region 12, instead of being arranged in one of the side regions 14.

One observes that such an embodiment illustrates an office chest of drawers 10 comprising three drawers 50 in its front region 11 of different heights and equal length and depth.

It should be pointed out that the drawers 50 of the front region 11 exhibit length and depth dimensions cooperating with the dimensions of the top side section 30. Thus, one observes that the drawers 50 of the front region 11 have a movement limit defined by the dimensions of top side section 30. Such an embodiment enables the last drawer 50 of the front region 11 not to occupy the additional area, below the back area 21 for putting objects, occupied by the lateral base section de base section and the top section 20, 30.

Thus, the side region 14 or the back region 12 can receive two drawers 50 with length, depth and height dimensions cooperating with the dimensions of the additional area below the back area 21 for putting objects, occupied by the lateral base section 20 and the top section 30.

Thus, one observes that, with arrangement of the drawers 50 in the front section 11 and in the back portion 12 or in the side region 14, the spaces occupied by the drawers do not exceed the internal volume determined by the office chest of drawers 10. In the embodiment of FIG. 4, here of the drawers 50 are opened from the front region 11 and two drawers 50 are opened from the back region 12 or by the side region 14.

The last drawer 50 of the front region 11 and the two drawers 50 of the back region 12 or of the side region 14 are more suitable for putting suspended folders. The other drawers 50 of the front region 11 are more suitable for objects of smaller volumes.

It should be pointed out that the drawers 50 arranged in the front region or back region are, respectively and opened from the front region 11 and back region 12. Alternatively, the drawers 50 can be opened by the side region 14 of the office chest of drawers 10, or be simultaneously opened either from the front region 11 or back region 12 as from the side region 14 of the office chest of drawers 10.

Figure 6:
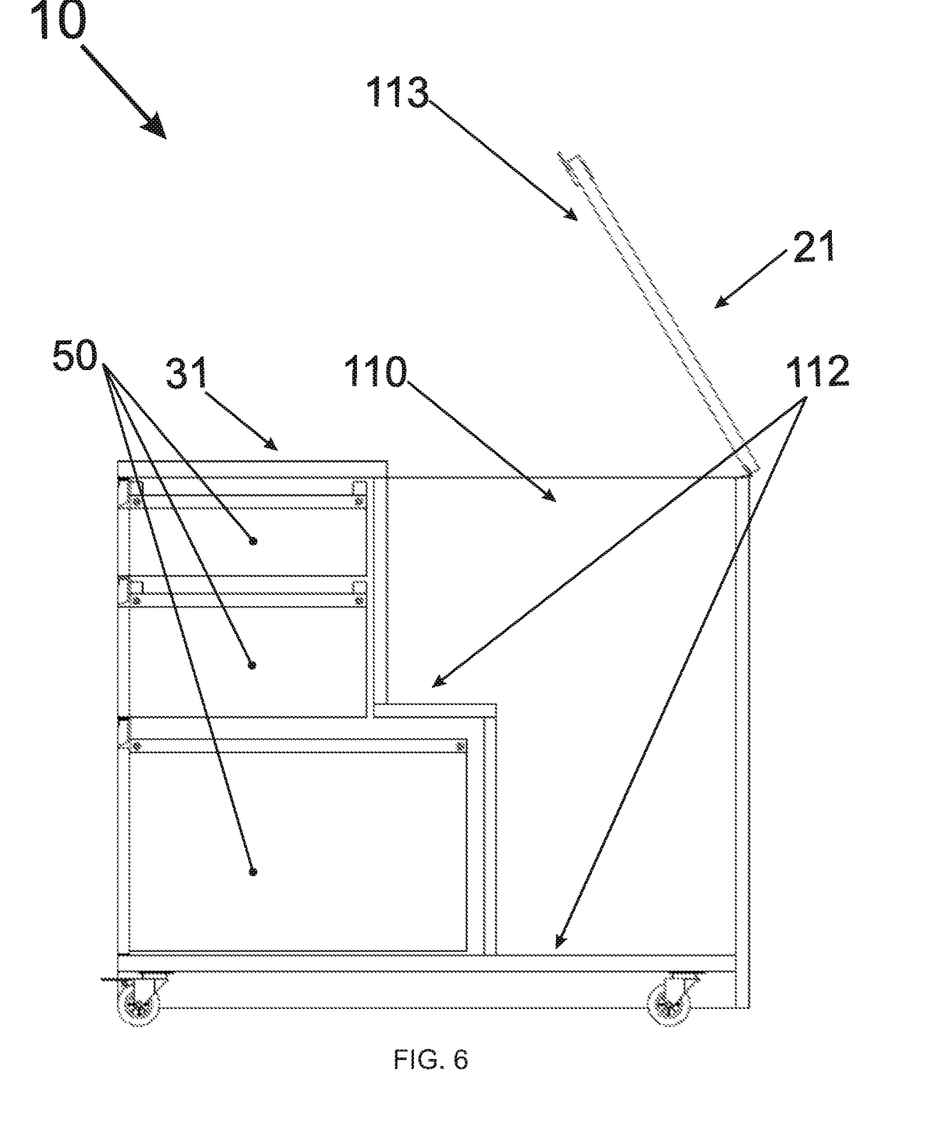
FIG. 6 is a cross-sectional view of an office chest of drawers provided with front drawers (2 small ones in the top and 1 big one in the bottom), the big drawer being used for putting suspended folders. The office chest of drawer being provided with a trunk in the back area for putting purses, brief cases, rucksacks among others.

In the embodiments illustrated in FIG. 6, it is shown a cross-sectional view of an office chest of drawers 10 provided with front drawers 50 (2 small ones in the top and 1 big one in the bottom), the big drawer 50 being used for putting suspended folders. The office chest of drawer being provided with a trunk 110 configured for sharing and for using all the possible space for putting for putting purses, brief cases, rucksacks among others. The trunk 110 having a geometry with blocks of space with bottoms 112 in different planes, so as to take better advantage of the difference in length of the drawers 50.

In all the embodiments illustrated in FIGS. 1 to 4 and 6, the office chest of drawers 10 comprises a set of castor at its lower region 15. More specifically the office chest of drawers 10 may comprise fixed castors 90 for support and linear displacement of the office chest of drawers, or rotary castors 91, for support and multidirectional displacement, or still a combination thereof.

Finally, the back and top areas 21, 31 for putting objects may comprise, in their outer limits, a set of borders 41 for better housing and holding the objects. The border 41 is made from metallic materials and is configured to receive at least one support 51 or at least one simple and removable support 52.

Figure 5A:
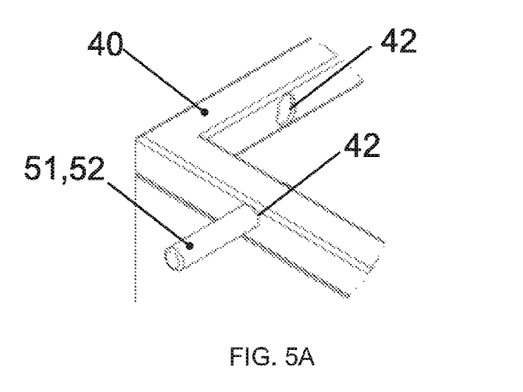
FIGS. 5A to 5G are illustrations of details of the support and of the socket arranged at the border, according to teachings of the present invention.
Figure 5B:
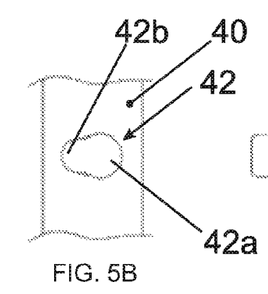
Figure 5C:
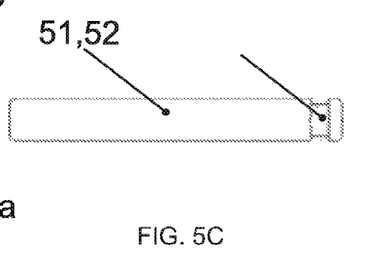
Figure 5D:
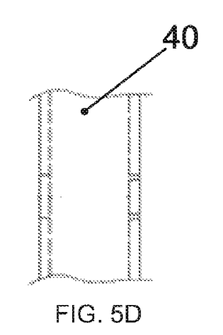
Figure 5E:
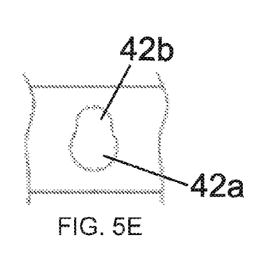
Figure 5F:
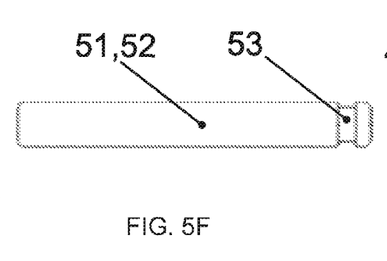
Figure 5G:
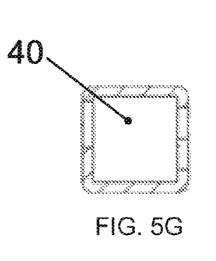
Figure 5H:
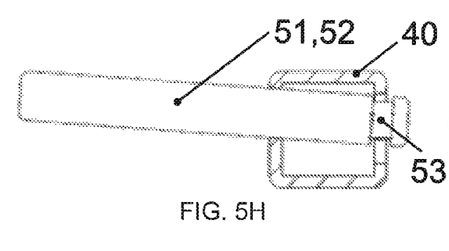
FIGS. 5H and 5I illustrate the insertion and fixation of the support to the border, according to teachings of the present invention.
Figure 5I:
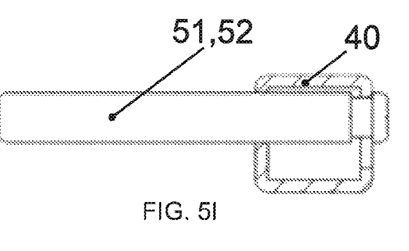

FIGS. 5A and 5I illustrate in detail at least one support 51 or of said at least one simple and removable support 52 and at least one socket 42 arranged at the border 41.

With a view to aggregate an accessory with "hook-type" tip, to hold objects that can be hanged, the support 51 has been developed. This support is an innovative item, being simple and may be easily placed or removed from adequate points at the border 41. More specifically, the support 51 is inserted and fixed to a socket 42 arranged at any point of the sides of the boarder 41. By sides of the border 41 one means the regions that are on the same plane of the sides 14 of the office chest of drawers 10.

The support 51 is pin-shaped, with recess 53 at one of the ends for insertion and fixation to the socket 42 of the border 41. The socket 42 has a profile with adequate housing for two walls, the first one being an inlet and support wall, and further as a counter-support with socket in the form of two interlinked bores, a lower one as a passage 42a, which enables insertion of the support 51, and an upper bore 42, which enables housing the recess of the support 51, keeping it fitted and fixed, so that the support 51 can have capacity of supporting adequate loads. It should be pointed out that said at least one simple and removable support 52 may be inserted and fixed to the socket 42, in the pace of the support 51.

An exemplary and non-limiting embodiment having been described, one should understand that the scope of the present invention embraces other possible variations, being limited only by the contents of the accompanying claims, which include the possible equivalents.

The invention claimed is:

1. An under desk file cabinet providing an area for putting objects, the under desk file cabinet (10) comprising:
    a lateral base section (20) associated to a top side section (30),
    at least one drawer (50) in a front region (11) of the cabinet (10), and
    at least one back area (21) at least in part defining a trunk space (110) positioned in a back region (12) of the cabinet (10) opposite the front region (11),
    wherein:
        the lateral base section (20) and the top side section (30) further define the at least one back area (21) for putting objects and at least one top area (31) for putting objects,
        said at least one drawer (50) in the front region (11) exhibits length and depth dimensions cooperating with dimensions of the top side section (30),
        an internal profile of the trunk space (110) of the at least one back area (21) is defined in part by a difference between a depth of each of the lateral base (20) section and the top side section (30) and a difference between a height of each of the lateral base section and the top side section, so as to accommodate objects larger than the back area (21).

2. The under desk file cabinet (10) according to claim 1, wherein the chest of drawers is substantially parallelepiped-shaped.

3. The under desk file cabinet (10) according to claim 1, wherein the at least one drawer (50) in the front region (11) comprises two or more drawers (50) in the front region (11) of equal or different heights.

4. The under desk file cabinet (10) according to claim 3, wherein the one or more drawers (50) are opened from the front region (11) of the office chest of drawers (10).

5. The under desk file cabinet (10) according to claim 3, wherein the one or more drawers (50) are opened from the side region (14) of the office chest of drawers.

6. The under desk file cabinet (10) according to claim 3, wherein the one or more drawers (50) are opened from both the front region (11) and side region (14) of the office chest of drawers (10).

7. The under desk file cabinet (10) according to claim 3, wherein the one or more drawers (50) in the front region (11) have a movement limit defined by the dimensions of the top side section (30).

8. The under desk file cabinet (10) according to claim 3, wherein the one or more drawers (50) in the front region (11) and the trunk (110) in the back region (12) are configured to occupy the whole internal volume of the office chest of drawers (10).

9. The under desk file cabinet (10) according to claim 1, wherein the at least one trunk space (110) has a cover (113).

10. The under desk file cabinet (10) according to claim 1, wherein the lateral base section (20) and the top side section (30) are integrally associated into a single volume.

11. The under desk file cabinet (10) according to claim 1, further comprising a set of castors in a bottom region (15).

12. The under desk file cabinet (10) according to claim 11, wherein the set of castors comprises either fixed castors (90) or rotary castors (91).

13. The under desk file cabinet (10) according to claim 1, wherein the trunk (110) and the top area (31) for putting objects comprise at least one border (41) at their outer limits.

14. The under desk file cabinet (10) according to claim 13, wherein at least one border (41) is made from metallic, wooden or plastic materials.

15. The under desk file cabinet (10) according to claim 13, wherein the at least one border (41) is configured to receive at least one support (51).

16. The under desk file cabinet (10) according to claim 15, wherein the support (51) exhibits a pin shape with a recess (53) for insertion and fixation into a socket (42) of the border (41).

17. The under desk file cabinet (10) according to claim 16, wherein the socket (42) of the border (41) comprises a profile with adequate housing composed by two walls, the first one being an inlet and support wall and the farther one being a counter-support wall with socket in the form of two interlinked bores.

18. The under desk file cabinet (10) according to claim 17, wherein the two interlinked bores of the socket (42) are a lower passage bore (42*a*) configured to receive the support (51) and an upper bore (42*b*) configured to house the support (51) recess, the support (51) being kept fitted and fixed and being configured to have the capacity of bearing adequate loads.

19. The under desk file cabinet (10) according to claim 15, wherein the support (51) exhibits a tip in the form of a hook for fitting and easy removal.

20. The under desk file cabinet (10) according to claim 13, wherein the at least one border (41) is configured to receive at least one simple and removable support (52).

21. The under desk file cabinet according to claim 1, wherein the at least one surface of the at least one trunk space (110) comprises at least one of: at least one bottom (112) and a cover (113), a side plate (111) and at least one bottom (112), a side plate (111) and a cover (113), or a side plate (111), at least one bottom (112), and a cover (113).

22. The under desk file cabinet according to claim 21, wherein the at least one surface of the trunk space (110) comprises two or more depths between the bottom (112) and the top side section (30).

\* \* \* \* \*